United States Patent [19]

Hourlier

[11] 4,155,406
[45] May 22, 1979

[54] PROTECTION AND WEARING DEVICE FOR EQUIDAE HOOVES

[76] Inventor: Leon Hourlier, 28, Ave. Jacqueminot, 92130 Meudon, France

[21] Appl. No.: 705,533

[22] Filed: Jul. 15, 1976

[30] Foreign Application Priority Data

Jul. 30, 1975 [FR] France .................................. 75 23768

[51] Int. Cl.² .............................................. A01L 3/00
[52] U.S. Cl. .......................................... 168/18; 54/82; 168/DIG. 1
[58] Field of Search ............... 54/82; 168/18, DIG. 1, 168/4, 17, 22, 24, 28, 19, 20, 21, 25, 26, 27

[56] References Cited

U.S. PATENT DOCUMENTS

| Re. 9,163 | 4/1880 | McKinney | 168/25 |
|---|---|---|---|
| 56,888 | 8/1866 | Bonnet | 168/18 |
| 289,177 | 11/1883 | Thomas et al. | 168/18 |
| 1,386,613 | 8/1921 | Frey | 168/18 |
| 3,236,310 | 2/1966 | Quick | 168/18 |

FOREIGN PATENT DOCUMENTS

| 265088 | 10/1913 | Fed. Rep. of Germany | 168/4 |
|---|---|---|---|
| 1191625 | 4/1965 | Fed. Rep. of Germany | 168/4 |
| 17252 of | 1896 | United Kingdom | 168/22 |

Primary Examiner—Richard T. Stouffer
Attorney, Agent, or Firm—George H. Mitchell, Jr.

[57] ABSTRACT

This plastic protection and wearing device for equidae hooves comprises a sole element attached to an upper element engaging the outer surface of the hoof and characterized in that the upper is open at its rear end, the rear end covered with a heel-piece notched to permit the passage of the horny heel plates of the hoof, the heel-piece having a front extension in the form of a pair of wing portions guided in relation to the sole and upper assembly in order to prevent any tilting of the heel-piece in relation to the said assembly when the hoof is enclosed therein.

5 Claims, 3 Drawing Figures

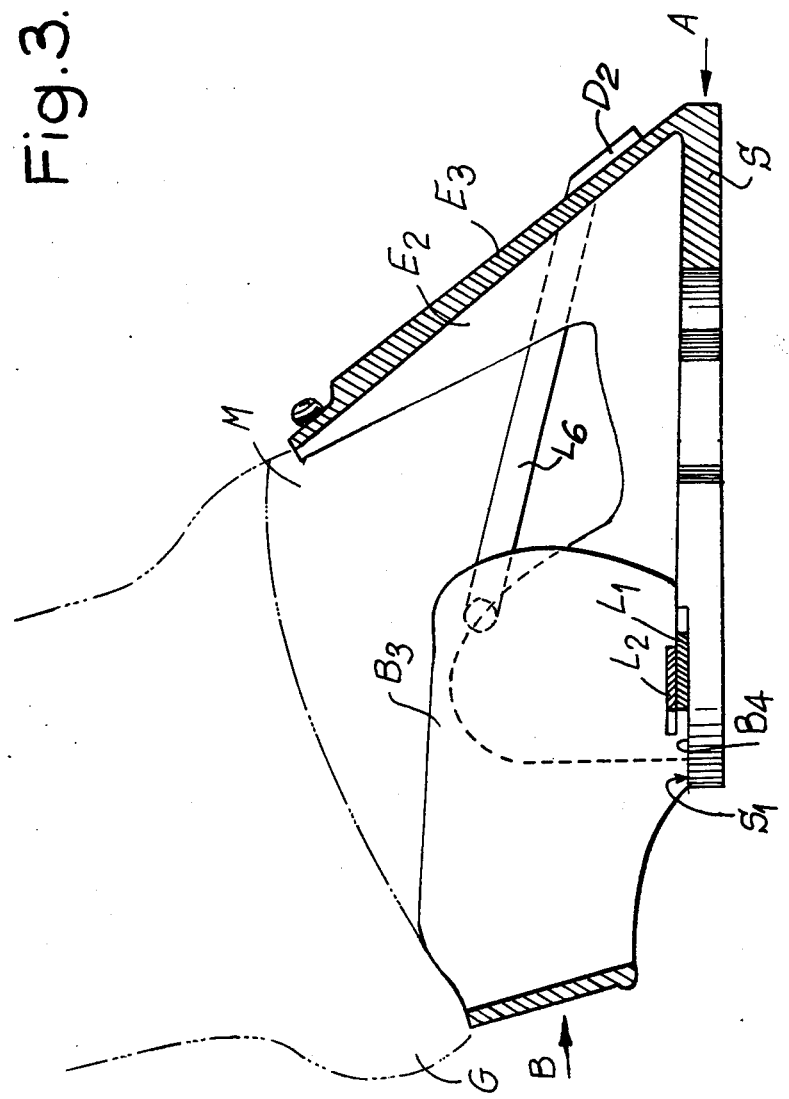

PROTECTION AND WEARING DEVICE FOR EQUIDAE HOOVES

FIELD OF THE INVENTION

The invention relates a new substitue plastic wearing pieces for conventional horseshoes of racing horses, notably trotters.

BACKGROUND OF THE INVENTION

Of late it was proposed to substitute plastic wearing pieces for the conventional horseshoes of racing horses, notably trotters.

However, up to recent years all attempts for fastening these plastic devices otherwise than by the conventional nails were unsuccessful.

It was therefore proposed to avoid the use of nails and the inconveniences deriving therefrom by covering the hoof with a kind of one-piece shoe secured by means of belts closing the open top portion thereof.

Experience teaches that this fastening method was rather unreliable for during a ride the animal would easily lose these plastic shoes, with all the extremely detrimental consequences likely to be expected for a horse ridden without iron shoes.

It is the essential object of the present invention to provide a plastic protection and wearing device for equidae hooves which is intended to constitute an efficient substitute for nailed horseshoes and adapted to be easily and rigidly fastened to the hoof without inasmuch unduly compressing the pair of horny heel plates.

STATEMENT OF THE INVENTION

According to the instant invention, this device comprising a sole-forming piece rigid with an upper engaging the side walls of the hoof is characterised in that said upper is open at its rear end and that this same portion is covered with a notched heel-piece permitting the passage of the heel plates and having a front extension comprising a pair of wings guided in relation to the sole and upper piece to prevent any tilting of said heel-piece, connecting and tightening means being also provided for holding said heel-piece against movement in relation to the sole and upper piece assembly when the hoof is enclosed therebetween.

DESCRIPTION OF THE DRAWING

The instant invention is described in more detail below with reference to the accompanying drawings in which:

FIG. 3 is a longitudinal section of the device.

DESCRIPTION OF THE PREFERRED EMBODIMENT

Figure 1:
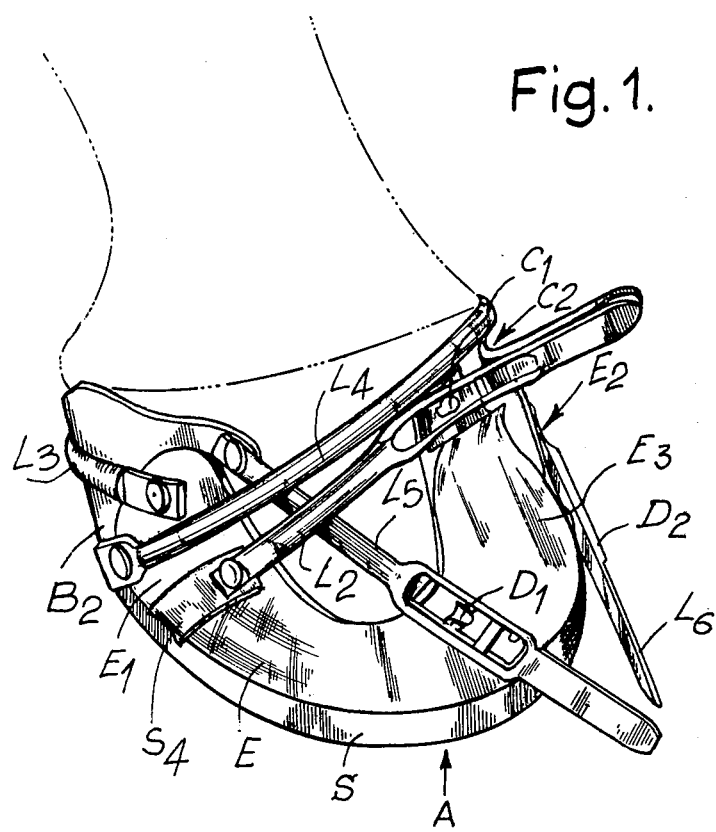
FIG. 1 is a perspective view of the device.
Figure 2:
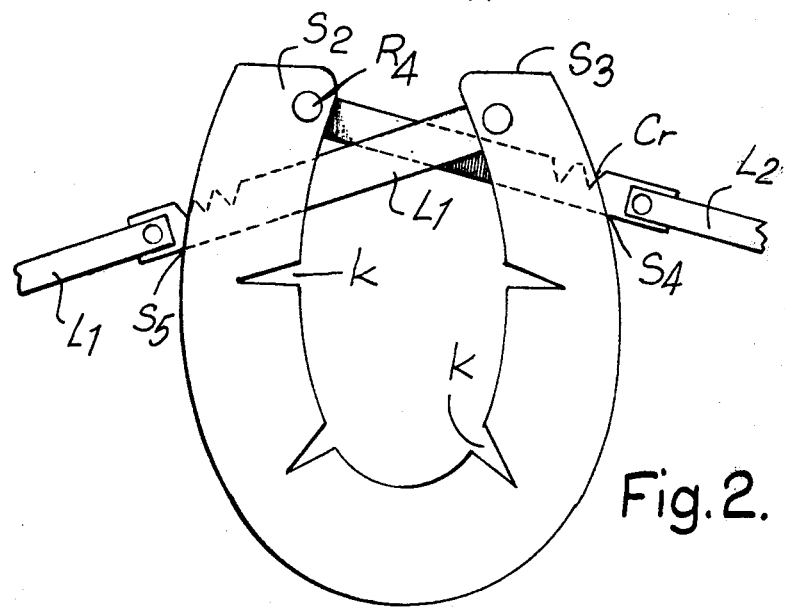
FIG. 2 is a plan view from beneath of the sole portion of the device.

As illustrated in the drawing, the device comprises a front member A consisting of two portions, namely a sole S and an upper E, a heel-piece B being associated with the rear portion of the sole S, these various elements being interconnected through means to be described presently.

The sole S of member A has the conventional horseshoe configuration, open at the rear and formed with notches K permitting an easy adaptation of the sole shape of the hoof configuration.

Overlying the sole S is the upper E deeply notched and formed with two rearward extensions $E_1$, $E_2$, and a front axial tongue $E_3$.

The heel-piece B has substantially the shape of a U lying on one side, the intermediate portion thereof being apertured to permit the passage of the pair of horny plates terminating the fork of the hoof, a pair of wings $B_2$ and $B_3$ completing the covering of the hoof surface M already covered at the front by the upper E. This heel-piece B comprises a land $B_4$ causing a substantial portion of the wings $B_2$, $B_3$ to engage the inner and top surface $S_1$ of sole S in order to be guided thereby and be prevented from tilting either up- or downwards when the tightening means are properly positioned.

Firstly, secured to the ends $S_2$ and $S_3$ of the sole (for example by means of rivets R) are straps $L_1$, $L_2$ passing through slots $S_4$, $S_5$ formed in the upper and in each wing at the level of said surface $S_1$. Both straps $L_1$, $L_2$ engage perforations formed in hook means $C_1$, $C_2$.

Advantageously said straps $L_1$, $L_2$ are notched on one edge (as shown at $C_r$) so that the notch registering with the end of slot $S_4$ (or $S_5$) will prevent the strap from receding when set in the selected tightening position.

On the other hand, the upper portions $E_1$ and $E_2$ are clamped against the hoof surface by means of another strap $L_3$ attached to $E_1$ and adapted to be fastened to $E_2$ after passing around the pair of horny plates of the hoof, and also by means of a complementary strap $L_4$ also attached to $E_1$ and fastened to $E_2$.

Finally, the fastening of heel-piece B to the front member A is completed by means of a pair of straps $L_5$ and $L_6$ disposed symmetrically, anchored to $B_2$, $B_3$ and adapted to be fastened to the front portion of the upper at $D_1$, $D_2$, respectively.

The above-described device is adapted not only to be reliably secured to the hoof, but also to meet important health and sanitary requirements for the hoof, such as aeration of the sole and fork, absence of any detrimental compressive effort on the pair of horny plates, etc.

What is claimed as new is:

1. A protective shoe for equidae hooves, comprising an assembly for engaging the surface of a hoof composed of a sole and upper of plastic material and a heel-piece of the sole, said heel-piece being adapted to cover the rear of a hoof and having a pair of forwardly extending wings, characterized in that the rear ends of said sole are provided with a pair of straps adapted to cross each other transversely below the hoof with their free ends extending upwardly exteriorly of the respective sides of the upper so as to be securable at the front of a hoof whereby said strap may be secured together to hold the heel-piece in place, said wings and upper being provided with slots through which said straps pass for holding the heel-piece against movement in relation to the sole and upper when the hoof is enclosed therein and means to draw the forward ends of the wings downwardly and inwardly toward the front of the sole.

2. Device according to claim 1, characterised in that the sole has the shape of a conventional horseshoe provided along its inner edge with notches permitting its distortion to facilitate its adaptation to the hoof configuration, the distance between the ends of said horseshoe being adjustable for exerting a clamping action on the side walls of the hoof.

3. Device according to claim 1, characterised in that said straps have lateral notches formed therein which are adapted to engage the sides of said slots for counteracting the tendency of said straps to retract therein.

4. Device according to claim 1, characterised in that said draw means comprises another pair of straps adapted to be anchored substantially to the middle of said upper for pulling each wing forward.

5. Device according to claim 1, characterised in that the rear portions of said upper are provided on the one hand with a lower strap for passing under the horny lateral plates of the hoof and for bearing against said heel piece and on the other hand with an upper strap for extending along the upper portion of the hoof surface and for interconnecting said rear portions.

* * * * *